Nov. 24, 1953    J. H. WILSON    2,660,074
ROTARY WORK HOLDING TABLE
Filed Dec. 15, 1952    3 Sheets-Sheet 1
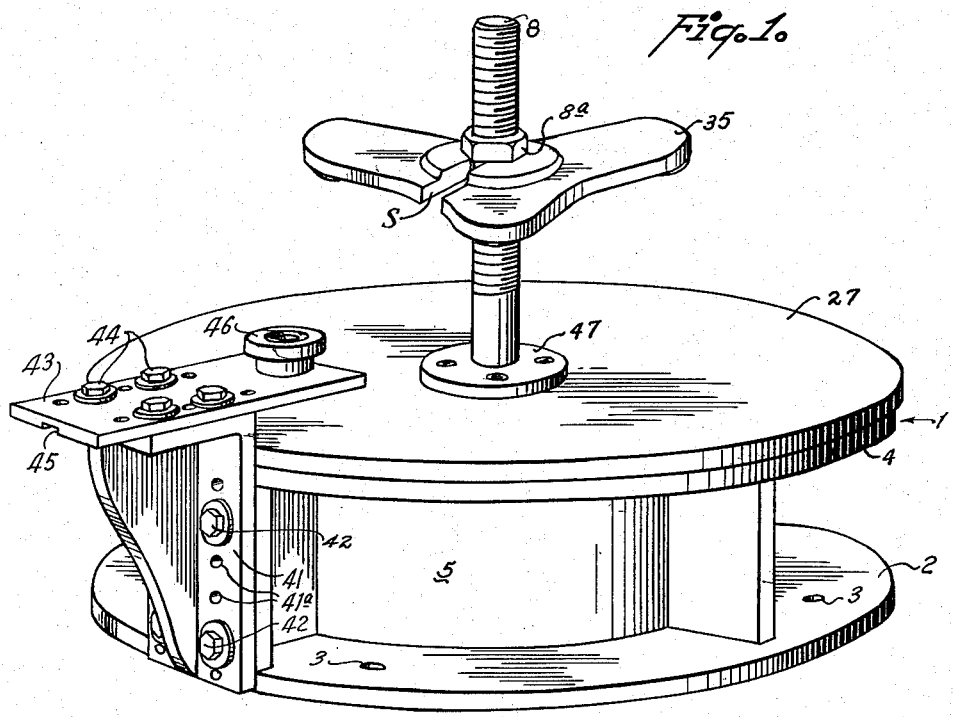
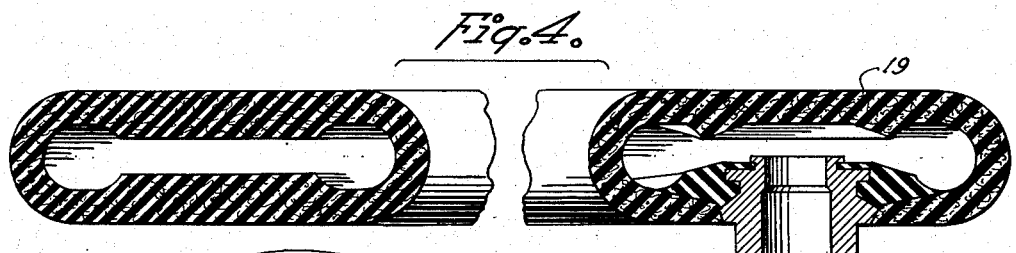
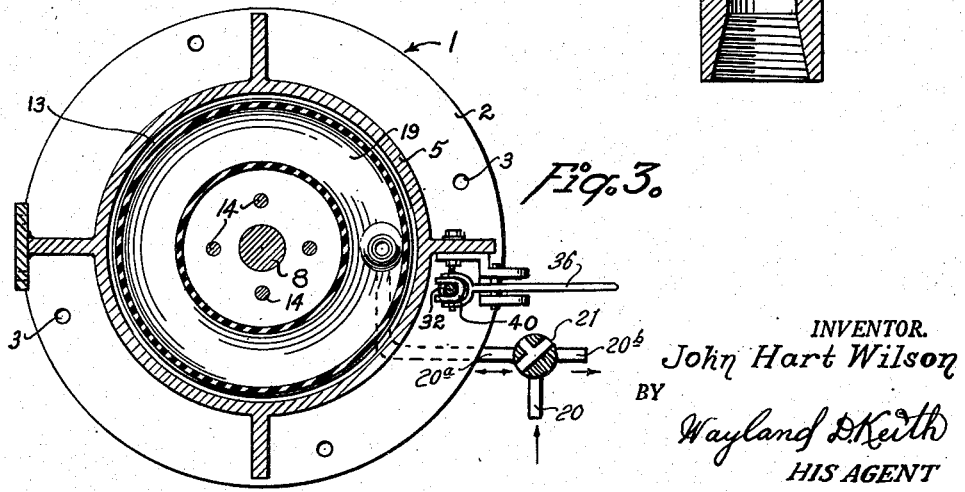
INVENTOR.
John Hart Wilson
BY
Wayland D. Keith
HIS AGENT

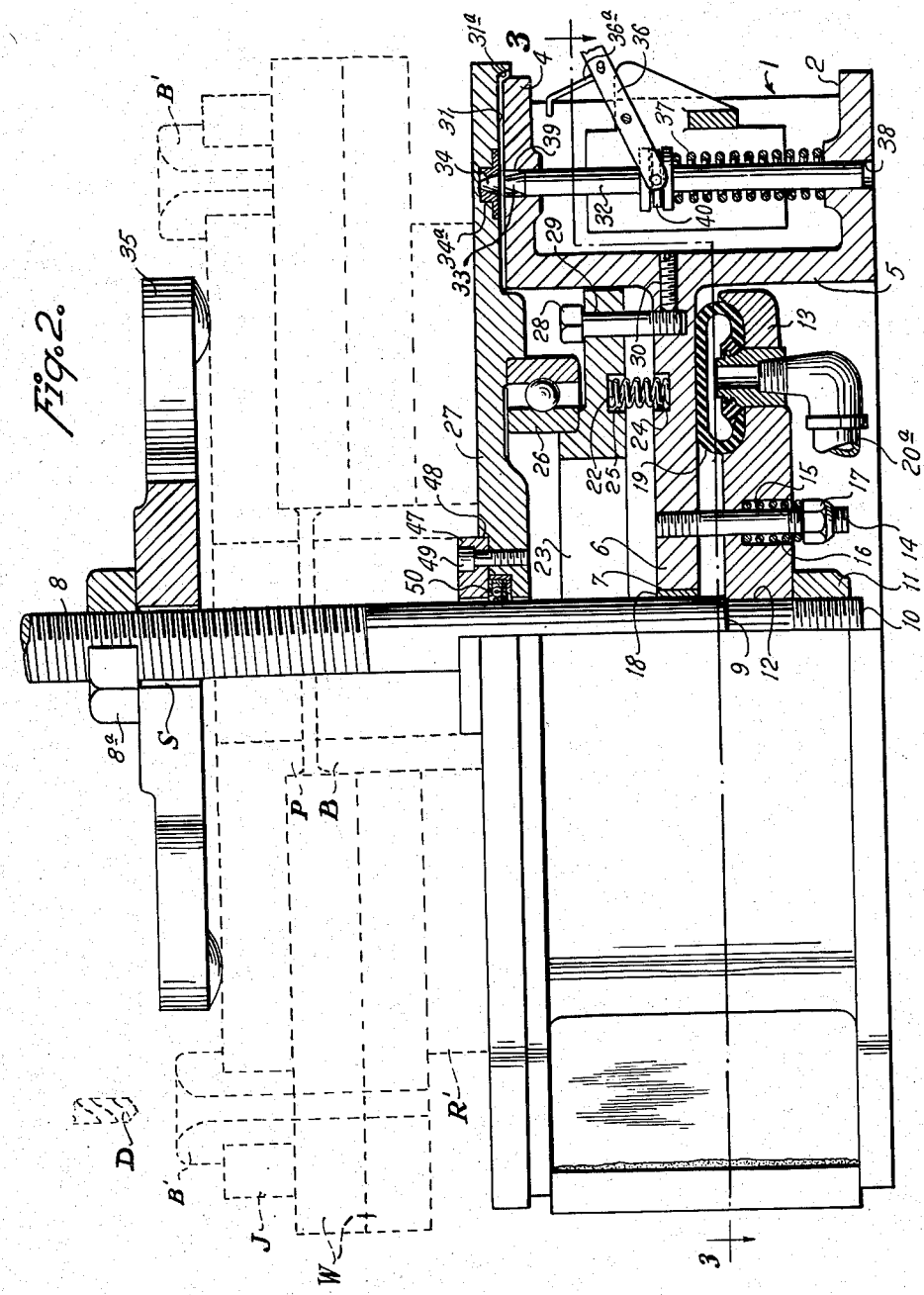

Nov. 24, 1953 J. H. WILSON 2,660,074
ROTARY WORK HOLDING TABLE
Filed Dec. 15, 1952 3 Sheets-Sheet 3

INVENTOR.
John Hart Wilson
BY
Wayland D. Keith
HIS AGENT

Patented Nov. 24, 1953

2,660,074

UNITED STATES PATENT OFFICE 2,660,074

ROTARY WORK HOLDING TABLE

John Hart Wilson, Wichita Falls, Tex.

Application December 15, 1952, Serial No. 326,116

11 Claims. (Cl. 77—63)

This invention relates to improvements in combination rotary work tables with fluid actuated clamping devices therefor, for use on drill presses and the like.

Work tables of the general character, but without clamping devices have been proposed heretofore, but these did not readily lend themselves to the holding of a wide variety of work pieces, as each work piece was required to be individually attached to the work table.

The present work table is readily adaptable for attachment to drill press tables, and when attached, work pieces may be quickly secured thereto by the fluid actuated clamp member to enable the completed drilling operation on each face of the work piece without having to reclamp it each time it is necessary to perform a separate drilling operation.

An object of this invention is to provide a work table with a fluid actuated clamping device, which table is freely rotatable when in released position and securely held against rotation when in clamped position.

Another object of this invention is to provide a work holding device for drill presses, which will hold work pieces securely while being operated upon, and yet release the work pieces quickly for removal therefrom.

Still another object of this invention is to provide a work holding device which is adapted to bindingly engage a jig to the work piece by action of an expansible fluid pressure device, when in clamped position, and yet release the jig and the clamping device to enable ready removal of the jig and work pieces therefrom upon release of fluid pressure.

A still further object of this invention is to provide a work holding table for holding work pieces, which table may be readily rotated about its axis and yet be held in a predetermined, indexed position for operations thereon by a drill through a single drill jig fixture.

Further objects of this invention and advantages thereof, will become apparent as the description proceeds and reference is had to the accompanying drawings in which like reference characters designate like parts in the several views thereof, in which:

Fig. 1 is a perspective view taken from the top and a side of the rotary work table and clamping device, showing an adjustable drill jig mounted on the base of the work holding device;

Fig. 2 is an enlarged elevational view of the rotary work table and clamping device, with parts broken away and shown in section to illustrate the details of construction, and showing the drill jig, work pieces, and the quickly removable clamping element in place;

Fig. 3 is a sectional view taken on the line 3—3 of Fig. 2, but on a reduced scale;

Fig. 4 is a fragmentary elevational view, with parts broken away and with parts shown in section, of the axially expansible fluid actuated tube for securing the relatively movable parts in fixed relation to the stationary part when pressure is applied to the tube;

Figure 5:
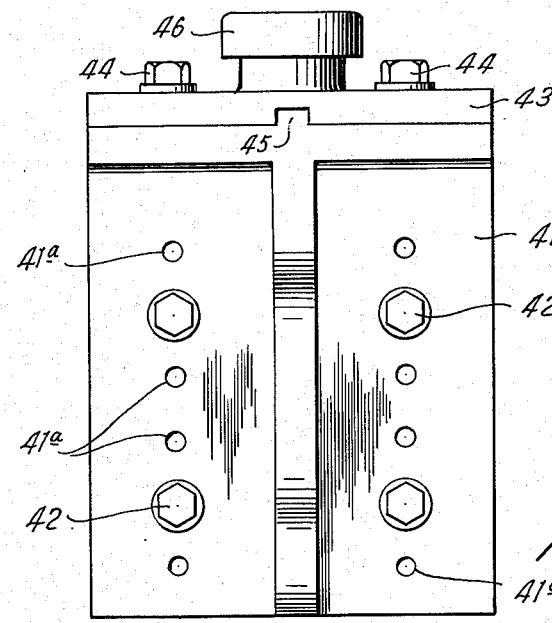
Figure 6:
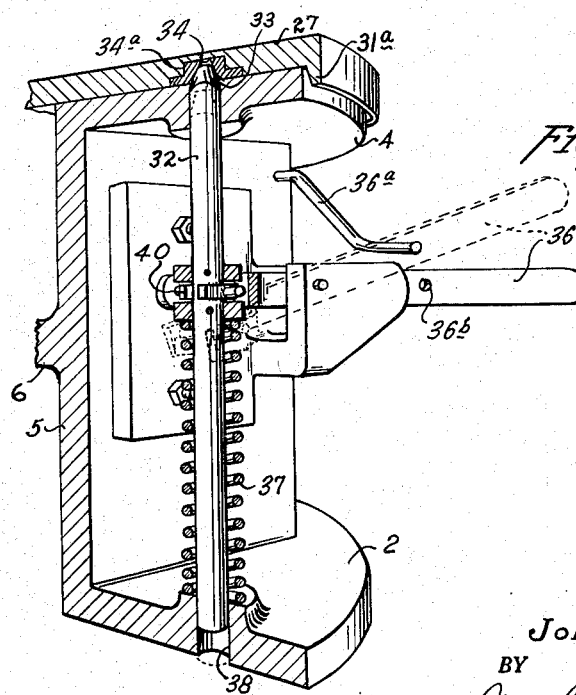

Fig. 5 is an elevational view of the adjustable drill jig holding fixture adapted to be bolted to the permanent base member of the rotary work holding device; and Fig. 6 is a perspective view, with parts broken away and with parts shown in section, of a slide bolt mechanism for holding the rotary work holding table in a predetermined fixed relation with respect to the stationary base member of the rotary work holding device, with the dotted outline of certain parts indicating the slide bolt as being moved into its disengaged position.

With more detailed reference to the drawing, the numeral 1 designates generally a base member, which may be of any desired configuration, to fit individual needs and requirements, however, for purposes of illustration in the present instance, the base is shown to be circular, and has a flange 2 on the lower side thereof in which flange bolt holes 3 are formed, so that bolts may be passed therethrough to secure the base 1 to a drill press table or to such other machine tool as the rotary work table is adapted to be used. The base member 1 has an out-turned flange 4 on the upper side thereof which flange 4 interconnects with the lower flange 2 by means of an annular web member 5. A disc like web member 6 is preferably formed integral with the annular web member 5 and has an axial bore 7 therein to receive a hold-down bolt 8, which passes therethrough, as will best be seen in Fig. 2.

The disc like web 6 also serves as the mounting member for the various other elements as will be brought out fully hereinafter.

The bolt 8 is shouldered at 9, near the lower end thereof and is threaded as indicated at 10 to receive a nut 11 so as to make it possible to secure the bolt 8 within a hole 12, which hole is formed axially in a plate member 13. The plate member 13 is resiliently supported below disc like member 6 by means of stud bolts 14, each of which have a spring 15 sleeved thereover and fitted within respective axially aligned recesses 16 that are formed in the lower face of plate member 13. A nut 17 is provided for each of the stud bolts 14 so as to adjust the position of the plate 13 with respect to disc-like web 6. The axial bolt 8 is rigidly secured to the plate 13 and moves therewith upon axial movement of this member 13.

A bushing 18 is fitted within the axial bore 7 so as to give a smooth sliding axial movement of the axially positioned bolt 8, upon movement of the plate 13 by action of fluid actuated expansible tube 19. The fluid actuated expansible tube 19 is axially expansible upon the introduction of fluid, such as hydraulic or air, thereinto through pipes 20 and 20a, which fluid is controlled by a three-way valve 21 to direct air from pipe 20 into pipe 20a into the tube 19 to inflate said tube, however, when it is desired to deflate the tube 19, the valve is moved into position to direct the air outward from pipe 20a into pipe 20b, which valve and piping is shown diagrammatically in Fig. 3.

A series of circumferentially spaced compression springs 22 are positioned between the disc-like web 6 and an annular ring 23, which compression springs 22 are retained in place by recesses 24 and 25 formed in the web and annular ring respectively. The springs 22 have a tendency to urge the annular ring 23, anti-friction bearing 26 and rotary workholding table 27 upward. The rotary work table 27 has an annular, down-turned peripheral flange 31a formed thereon, which surrounds the flange 4 in such manner as to direct foreign particles, water, and the like outward. The upward movement of the rotary work table 27 is limited by the heads of circumferentially spaced bolts 28, which bolts threadably engage the disc-like web 6 and extend upward through circumferentially spaced holes 29 formed in annular ring 23. These bolts 28 are held in place by locking set screws 30, as will best be seen in Fig. 2.

With the fluid pressure released from expansible tube member 19, the springs 25 exert such thrust as to lift the annular ring 23, bearing 26, and rotary work table 27 upward together with the work pieces W and jig J until a clearance, as indicated at 31, exists between the upper face of flange member 4 and the lower adjacent face of the rotary work table 27, and with the slide bolt 32 locked in a retracted position as indicated in full lines in Fig. 2 and dotted outline in Fig. 6, the work table and work pieces may be rotated to the desired place. The fluid pressure may be applied to the tube 19 by moving valve 21 into position to direct fluid under pressure thereinto to cause a downward movement of plate 13, bolt 8, nut 8a, work piece C-clamp member 35, jig J and work pieces W, whereupon the axial force exerted by fluid pressure in the expansible tube 19 will be transmitted to the top of rotary work table 27 to force the annular lower portion of the work table into contact with the adjacent upper face of flange 4, whereupon the jig J, work pieces W and work table 27 are held securely against movement, while the drilling operation is performed on the work pieces. It is to be pointed out that, when the under surface of the work table is brought into binding engagement with the upper face of the flange 4, that the only axial strain on the bearings 26, is the thrust exerted by springs 22. The springs 22 may be so adjusted as to give sufficient clearance between the upper face of the flange 4 and the lower adjacent face of work table 27, so that the movement imparted by the fluid actuated expansible tube 19 need be a fractional portion of an inch.

When it is desired to drill uniformly, circumferentially spaced holes without using a special jig, the rotary work table 27 may be so positioned as to enable the engagement of the tapered point 33 of the slide bolt 32 into one of a series of recesses 34 formed in bushing 34a. The slide bolt 32 is actuated by the pivoted lever 36, which lever is moved against tension of spring 37 to disengage the slide bolt 32 from one of the respective recesses 34 so as to enable the rotary work table 27 to be rotated the degree desired, so when the slide bolt lever 36 is released it will register with one of the recesses 34 which enables the spring 37 to urge slide bolt 32 upward to cause engagement of the tapered point 33 of slide bolt 32 in the complementarily formed recess 34. It is to be pointed out that the slide bolt 32 is guided at bottom and top in holes 38 and 39 formed in the respective flanges 3 and 4, and that a yoke 40 is provided on the slide bolt, as will best be seen in Figs. 2 and 3, to enable the slide bolt to be moved in aligned relation with respect to holes 38 and 39.

When a series of recesses 34, such as three six, etc., are made in the lower side of rotary work table 27 a jig fixture may be used therewith such as a vertically adjustable jig fixture 41, Figs. 1 and 5 may be bolted to the side of the base 1 by means of bolts 42, and with this fixture adjusted to the proper height, a radially adjustable drill jig holding fixture 43 is held in place by bolts 44, which fixture is held against lateral movement by a tongue and groove arrangement 45 on the fixtures 41 and 43, respectively. It is preferable to have a movable drill bushing 46, that may be readily removed and replaced, to accommodate drills of various sizes, which will enable the changing from one size drill D to another expeditiously.

Operation

With the flange 3 of the base 1 securely bolted to the drill press table or base of the drill press, and with the pipe 20 connected to a suitable source of fluid pressure, the rotary work holding table is ready to receive work. The slotted clamp member 35 is removed from the axial bolt and a bushing B is fitted snugly over upstanding axially aligned guide boss 47. Whereupon, the work supporting ring R is fitted over bushing B to support work pieces W, each of which has a bore complementary with the outer diameter of the bushing B.

A drill jig J, having an annular, downwardly protruding boss P, interfits within the bore of the uppermost of the work pieces W so as to axially align the jig J with the work pieces W and rotary table 27. The jig J preferably has a series of circumferentially spaced bushings B' fitted therein, which bushings are of a pattern of the hole spacing it is desired to drill in work pieces W.

After the jig is fitted in place, the slotted clamp 35 is moved laterally on to bolt 8 so the slot S will receive the bolt 8 below the nut 8a. The nut 8a may be screwed downward by hand until it comes into contact with the upper face of slotted clamp 35.

With the work thus aligned, and with a drill in alignment with one of the drill bushings B', the three-way valve 21 is moved into position to direct air or other fluid pressure through pipe 20 into and through valve 21 into pipe 20a leading to the annular, axially expansible, flexible rubber tube element 19 which is positioned between the stationary disc-like web 6 and the axially movable plate member 13. Upon axial expansion of tube 19, plate member 13 is moved against the tension of the relatively weak springs 15 to move the plate 13 and the axial bolt 8 downward, which in turn will transmit this force through nut 8a and slotted clamp member 35 to jig J, work pieces W, ring R to transmit the thrust to rotary work table 27 to move the table 27, bearing 26, and annular ring 23 downward to compress a relatively strong spring 22 to cause the seating of face 31 of the work table 27 on the upper face of the flange 4. With the worktable thus seated, the work will be held in secure relation against turning or against further downward movement.

After the drilling operation has been performed through one of the bushings B', the fluid pressure is relieved by moving valve 21 into position to exhaust the pressure from tube 19 through pipe 20a and out through pipe 20b with the pipe 20 being closed during this operation. With the pressure thus relieved, the spring 22 will lift ring 23, bearing 26, and rotary work table 27, ring R, work pieces W and drill jig J to enable the rotation of the table 27. The springs 15, which are considerably weaker than the spring 22, will move plate member 13 upward to expel the air from tube 19 and also move bolt 8 upward to enable the removal of the slotted clamp 35 laterally from beneath nut 8a, however, the table will also be in condition to be rotated through the desired spacing of the hole until the drill is in alignment with another of the bushings B', whereupon, the above operation is repeated until the drilling of the successive holes is completed. Then, by releasing the pressure from the tube 19, as hereinbefore described, the slotted clamp 35 may be removed laterally from the bolt 8, without the removal of the nut, which will enable the jig J and work pieces W to be readily removed from the table 27, so other work pieces W and the jig J may replace them without the necessity of removing the nut 8a each time such change is to be made.

It is to be pointed out that the strength of the springs 15 need be sufficiently strong to lift the plate 13, bolt 8a and to compress the tube 19 sufficiently to deflate the tube 19 when the valve 21 is open, as the springs 22 are sufficiently strong to lift the rotary table 27, ring R and jig J. The springs 15 and 22 work in cooperative relation in the same direction, but each has independent functions to perform.

The head of the bolt 28 limits the upward movement of annular ring 23 when the tube 19 is deflated. This enables the rotary work table 27 to be held a spaced distance above flange 4 to enable the free rotation of the table on antifriction bearing 26.

Figs. 1 and 5 show a modified form of drill jig holding fixture attached to the base of the rotary work holding table 27, and Figs. 2, 3 and 6 show a slide bolt arrangement for holding the rotary table 27 in predetermined fixed relation with respect to the base 1, so as to enable the drilling of holes in prearranged, circumferentially spaced relation.

A jig fixture bracket 41, has holes 41a in aligned, vertically spaced relation to enable the bracket to be bolted to the base 1 at different heights with respect thereto, by means of bolts 42. The bracket is out-turned at the upper end thereof and has an upstanding rib 45 thereon to enable an inwardly extending drill jig holding fixture 43 to be interfitted therewith so as to enable the drill jig holding fixture 43 to be moved outward and inward in aligned, guided relation with respect to the rib 45 on the jig fixture bracket 41.

When the drill jig holding fixture 43 is adjusted to the desired position with respect to the center, bolts 44 clamp the drill jig fixture 43 so as to enable the drill D to pass through bushing 46 into the work holding piece positioned therebelow. By utilizing the slide bolt 32 to hold the rotary work holding table 27 against turning, while the drilling operation is performed, by depressing lever 36, the slide bolt 32 is withdrawn from recess 34 to enable the work holding table 27 to be rotated until another recess 34 is reached, whereupon, the slide bolt 32 is moved up under the influence of spring 37 to lock the table against rotation until another hole is drilled. When it is desired to hold the slide bolt 32 in retracted position, as indicated in full outline in Fig. 2 and dotted outline in Fig. 6, a lever lock 36a is swung into position to engage a hole 36b formed in lever 36, to enable the slide bolt 32 to be held in retracted position.

Having thus described the invention, what is claimed is:

1. In a device of the character described, a base, a screw threaded bolt slidably mounted in said base and upstanding therefrom, a clamp mounted on said screw threaded bolt, a rotary work holding table having a hole formed therein sleeved over said screw threaded bolt, a ring member slidably mounted within said base and adapted to receive a bearing thereon, a bearing mounted between said ring member and said table and mounting said table for rotation with respect to said base when said table is raised there-above, resilient means for normally supporting said table a spaced distance above said base, and means for moving said screw-threaded bolt with respect to said base to exert a clamping action on a work piece positioned between said clamp and said table so as to draw said work and said table into binding engagement with said base to prevent relative rotation therebetween.

2. In a device of the character described, a base, a screw-threaded bolt slidably mounted in said base and upstanding therefrom, a clamp mounted on said screw-threaded bolt, a rotary work holding table having a hole formed therein sleeved over said screw-threaded bolt, a ring member slidably mounted within said base and adapted to receive a bearing thereon, a bearing mounted between said ring member and said table and mounting said table for rotation with respect to said base when said table is raised there-above, resilient means for normally supporting said table a spaced distance above said base, and fluid actuated means for moving said screw-threaded bolt with respect to said base to exert a clamping action on a work piece positioned between said clamp and said table so as to draw said work and said work table into binding engagement with said base to prevent relative rotation therebetween.

3. In a device of the character described, a base, a screw-threaded bolt slidably mounted in said base and upstanding therefrom, a clamp mounted near one end of said screw-threaded bolt, a resiliently supported disc member mounted near the other end of said screw-threaded bolt and being movable therewith, a rotary work holding table having a hole formed therein sleeved over said screw-threaded bolt, a ring member slidably mounted within said base and adapted to receive a bearing thereon, a bearing mounted between said ring member and said table and mounting said table for rotation with respect to said base when said table is raised there-above, resilient means for normally supporting said table a spaced distance above said base, and a substantially annular, pressure responsive, tubular means interposed between said disc and said base for moving said screw-threaded bolt with respect to said base to exert a clamping action on a work piece positioned between said clamp and said table so as to draw said work and said table into binding engagement with said base to prevent relative rotation therebetween.

4. In a device of the character described, a base, a screw-threaded bolt slidably mounted in said base and upstanding therefrom, a clamp mounted on said screw-threaded bolt, a rotary work holding table having a hole formed therein sleeved over said screw-threaded bolt, a ring member slidably mounted within said base and adapted to receive a bearing thereon, a bearing mounted between said ring member and said table and mounting said table for rotation with respect to said base when said table is raised there-above, resilient means for normally supporting said table a spaced distance above said base, means for moving said screw-threaded bolt with respect to said base to exert a clamping action on a work piece positioned between said clamp and said table so as to draw said table into binding engagement with said base to prevent relative rotation therebetween, and means for limiting the upward movement of said ring member mounting said rotary work table.

5. In a device of the character described, a base, a screw-threaded bolt slidably mounted in said base and upstanding therefrom, a clamp mounted on said screw-threaded bolt, a rotary work holding table having a hole formed therein sleeved over said screw-threaded bolt, a ring member slidably mounted within said base and adapted to receive a bearing thereon, a bearing mounted between said ring member and said table and mounting said table for rotation with respect to said base when said table is raised there-above, resilient means for normally supporting said table a spaced distance above said base, means for moving said screw-threaded bolt with respect to said base to exert a clamping action on a work piece positioned between said clamp and said table so as to draw said table into binding engagement with said base to prevent relative rotation therebetween, and manually controlled locking means for holding said table in a predetermined position.

6. In a device of the character described, a base, a screw-threaded bolt slidably mounted in said base and upstanding therefrom, a clamp mounted on said screw-threaded bolt, a circular, rotary work holding table having an axial hole formed therein sleeved over said screw-threaded bolt, a ring member slidably mounted within said base and adapted to receive a bearing thereon, a bearing mounted between said ring member and said circular table and mounting said table for rotation with respect to said base when said table is raised there-above, resilient means for normally supporting said table a spaced distance above said base, and means for moving said screw-threaded bolt with respect to said base to exert a clamping action on a work piece positioned between said clamp and said table, so as to draw said work piece and said table into binding engagement with said base to prevent relative rotation therebetween.

7. In a device of the character described, a base, a rod slidably mounted in said base and upstanding therefrom, a clamp mounted on said upstanding rod, a circular, rotary table having an axial hole formed therein sleeved over said upstanding rod, a ring member slidably mounted within said base and adapted to receive a bearing thereon, a bearing mounted between said ring and said circular table and mounting said table for rotation with respect to said base when said table is raised there-above, resilient means for normally supporting said table a spaced distance above said base, and means for moving said upstanding rod with respect to said base to exert a clamping action of a work piece, positioned between said clamp and said table, so as to draw said table into binding engagement with said base to prevent relative rotation therebetween.

8. In a device of the character described, a base, a rod slidably mounted in said base and upstanding therefrom, a clamp mounted on said upstanding rod, a rotary work table having a hole formed therein sleeved over said upstanding rod, a ring member slidably mounted within said base and adapted to receive a bearing thereon, a bearing mounted between said ring member and said table and mounting said table for rotation with respect to said base when said table is raised thereabove, resilient means for normally supporting said table a spaced distance above said base, and fluid actuated means for moving said upstanding rod with respect to said base to exert a clamping action on a work piece positioned between said clamp and said table, so as to draw said table into binding engagement with said base to prevent relative rotation therebetween.

9. In a device of the character described, a base, a rod slidably mounted in said base and upstanding therefrom, a clamp mounted near one end of said upstanding rod, a resiliently supported disc member mounted near the other end of said upstanding rod and being movable therewith, a rotary work table having a hole formed therein sleeved over said upstanding rod, a ring member slidably mounted within said base and adapted to receive a bearing thereon, a bearing mounted between said ring member and said table and mounting said table for rotation with respect to said base when said table is raised thereabove, resilient means for normally supporting said table a spaced distance above said base, and a substantially annular, pressure responsive, tubular means interposed between said disc and said base for moving said upstanding rod with respect to said base to exert a clamping action on a work piece positioned between said clamp and said table so as to draw said table into binding engagement with said base to prevent relative rotation therebetween.

10. In a device of the character described, a base, a screw threaded bolt slidably mounted in said base and upstanding therefrom and having a nut thereon, a slotted clamp member on said screw threaded bolt beneath said nut, said clamp member being adapted to clamp work pieces therebelow, a rotary work table having a hole formed therein sleeved over said screw threaded bolt, a ring member slidably mounted on said base and adapted to receive a bearing thereon, a bearing mounted between said ring member and said table and mounting said table for rotation with respect to said base when said table is raised there-above, resilient means for normally supporting said table a spaced distance above said base, a flexible tube member for moving said screw threaded bolt with respect to said base to exert a clamping action on a work piece positioned between said slotted clamp and said table so as to draw said table into binding engagement with said base to prevent relative rotation therebetween.

11. In a device of the character described, a base, a screw threaded bolt slidably mounted in said base and upstanding therefrom and having a nut thereon, a clamp member on said screw threaded bolt beneath said nut, said clamp member being adapted to clamp work pieces therebelow, a rotary work table having a hole formed therein sleeved over said screw threaded bolt, a ring member slidably mounted on said base and adapted to receive a bearing thereon, a bearing mounted between said ring member and said table and mounting said table for rotation with respect to said base when said table is raised thereabove, resilient means for normally supporting said table a spaced distance above said base, an annular, axially expansible, flexible tube member for moving said screw threaded bolt with respect to said base to exert a clamping action on a work piece positioned between said clamp member and said table so as to draw said table into binding engagement with said base to prevent relative rotation therebetween.

JOHN HART WILSON.

References Cited in the file of this patent

UNITED STATES PATENTS

| Number | Name | Date |
|---|---|---|
| 595,404 | McArthey | Dec. 14, 1897 |